US009266674B2

(12) United States Patent
Reimer et al.

(10) Patent No.: US 9,266,674 B2
(45) Date of Patent: Feb. 23, 2016

(54) VERTICAL STORAGE SYSTEM

(71) Applicant: Vidir Machine Inc., Arborg (CA)

(72) Inventors: Jason T. Reimer, Arborg (CA); Melvin R. Penner, Arborg (CA); Sidney Dueck, Arborg (CA)

(73) Assignee: Vidir Machine Inc, Arborg (CA)

( * ) Notice: Subject to any disclaimer, the term of this patent is extended or adjusted under 35 U.S.C. 154(b) by 0 days.

(21) Appl. No.: 13/867,622

(22) Filed: Apr. 22, 2013

(65) Prior Publication Data

US 2014/0311995 A1    Oct. 23, 2014

(51) Int. Cl.
| A47F 7/30 | (2006.01) |
| B65G 1/10 | (2006.01) |
| B65G 1/02 | (2006.01) |
| B65G 1/127 | (2006.01) |
| A47F 5/00 | (2006.01) |

(52) U.S. Cl.
CPC ........ *B65G 1/026* (2013.01); *B65G 1/10* (2013.01); *B65G 1/127* (2013.01); *A47F 5/0081* (2013.01); *A47F 7/30* (2013.01)

(58) Field of Classification Search
CPC ......... A47F 5/0081; A47F 7/30; B65G 1/026; B65G 1/10; B65G 1/127
USPC .......... 211/1.57, 126.2, 126.6, 153, 175, 187, 211/190, 195, 207, 208, 209; 312/306, 312, 312/319.5–219.8, 319.5–319.8; 187/244, 187/249, 255, 256; 414/331.14
See application file for complete search history.

(56) References Cited

U.S. PATENT DOCUMENTS

| 1,165,308 | A | * | 12/1915 | Barnes | 211/209 |
| 2,779,487 | A | * | 1/1957 | Harris | 414/787 |
| 3,001,845 | A | * | 9/1961 | Thompson | 312/272.5 |
| 3,157,155 | A | * | 11/1964 | Duntley | 119/489 |
| 3,637,095 | A | * | 1/1972 | Kampfer | 414/331.07 |
| 4,345,802 | A | * | 8/1982 | Sorensen | 312/42 |
| 4,674,938 | A | * | 6/1987 | Van Stokes et al. | 414/228 |
| 4,826,384 | A | | 5/1989 | Okura et al. | |
| 5,054,578 | A | | 10/1991 | Smillie, III et al. | |
| 5,129,611 | A | * | 7/1992 | Grover et al. | 248/688 |
| 5,423,503 | A | * | 6/1995 | Tanaka et al. | 248/277.1 |
| 6,106,210 | A | | 8/2000 | Toxer | |
| 6,241,048 | B1 | | 6/2001 | Heilmann | |
| 6,533,533 | B1 | | 3/2003 | Heston | |
| 6,641,351 | B2 | | 11/2003 | Payne | |
| 7,028,811 | B2 | | 4/2006 | Rauch | |
| 7,597,521 | B2 | | 10/2009 | Wastel | |
| 8,075,237 | B2 | | 12/2011 | Webster et al. | |
| 8,485,618 | B2 | * | 7/2013 | Benz et al. | 312/408 |
| 2004/0096303 | A1 | * | 5/2004 | Resta | 414/331.13 |

OTHER PUBLICATIONS

Product Brochure from Vidir Inc., Downloaded and Printed Apr. 2006.

* cited by examiner

*Primary Examiner* — Joshua Rodden
(74) *Attorney, Agent, or Firm* — Adrian D. Battison; Ade & Company Inc

(57) ABSTRACT

A vertical storage system for efficiently storing large items in a vertical manner thereby conserving floor space. The vertical storage system includes a frame, a plurality of connecting members slidably connected between the platforms and a winch device connected between the platforms and a winch device connected to the uppermost platform. Lifting the uppermost platform results in the raising of the next platform beneath the uppermost platform and so forth. Lowering the uppermost platform lowers all of the platforms until the lowest platform is at the bottom with the remaining platforms lowered until stacked upon one another.

3 Claims, 21 Drawing Sheets

VERTICAL STORAGE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a vertical storage device and more specifically it relates to a vertical storage system for efficiently storing large items in a vertical manner thereby conserving floor space.

2. Description of the Related Art

Any discussion of the related art throughout the specification should in no way be considered as an admission that such related art is widely known or forms part of common general knowledge in the field.

Storage of larger items (e.g. bed mattresses, bed frames) can be difficult particularly when attempting to stack the items. In addition, since larger items can only be stacked safely and physically a certain height, individuals are forced to store the items in a horizontal manner instead of a vertical manner. In addition, even when larger items are vertically stacked, it is difficult to reach and remove the uppermost of the items when needed.

Because of the inherent problems with the related art, there is a need for a new and improved vertical storage system for efficiently storing large items in a vertical manner thereby conserving floor space.

BRIEF SUMMARY OF THE INVENTION

The invention generally relates to a vertical storage system which includes a frame, a plurality of platforms slidably positioned within the frame, a plurality of connecting members slidably connected between the platforms and a winch device connected to the uppermost platform. Lifting the uppermost platform results in the raising of the next platform beneath the uppermost platform and so forth. Lowering the uppermost platform lowers all of the platforms until the lowest platform is at the bottom with the remaining platforms lowered until stacked upon one another.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
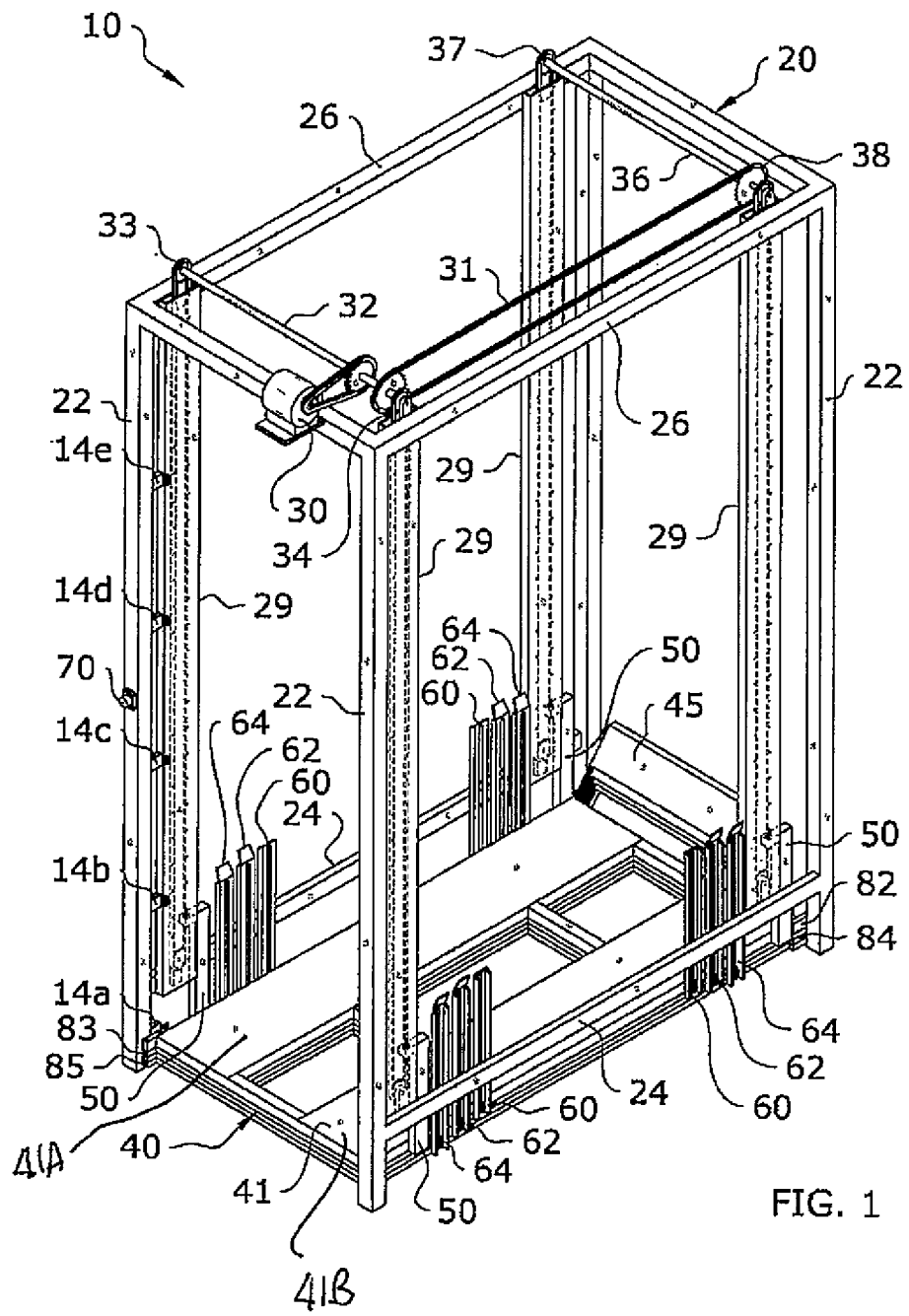
FIG. 1 is a front upper perspective view of the present invention illustrating the plurality of platforms stacked upon one another in an initial lowered position for loading.

A. Overview.

Turning now descriptively to the drawings, in which similar reference characters denote similar elements throughout the several views, FIGS. 1 through 10c illustrate a vertical storage system 10, which comprises a frame 20, a plurality of platforms 40 slidably positioned within the frame 20, a plurality of connecting members slidably connected between the platforms 40 and a winch device connected to the uppermost platform. Lifting the uppermost platform results in the raising of the next platform beneath the uppermost platform and so forth. Lowering the uppermost platform lowers all of the platforms 40 until the lowest platform is at the bottom with the remaining platforms 40 lowered until stacked upon one another.

Various types of storage items 12 may be received, stored and retrieved with respect to the present invention. The storage items 12 may be larger in size such as but not limited to a bed mattress. FIGS. 3a through 3e illustrate the positioning of a plurality of storage items 12 upon the platforms 40, with one storage item 12 positioned upon each of the platforms 40. It can be appreciated that more than one storage item 12 may be positioned upon each platform. The platforms 40 preferably have an elongated rectangular structure to support a corresponding elongated rectangular storage item 12 (e.g. bed mattresses). The storage items 12 are preferably comprised of a flat structure having a thickness that is approximately the same throughout such as a conventional bed mattress.

B. Frame.

FIGS. 1 through 5e best illustrate the frame 20 utilized within the present invention. The frame 20 defines a front opening to load the storage items 12 upon the platforms 40. The front opening has a width and a height, wherein the height is greater than the width. The frame 20 further defines a vertical storage space having a longitudinal axis that is vertically orientated. The vertical storage space has a rectangular cross section along a horizontal plane. The frame 20 preferably has a height that is greater than a width or length of the frame 20. The width of the frame 20 is preferably smaller than the length of the frame 20.

The frame 20 may be comprised of an open structure along the sides, top and rear as illustrated in FIGS. 1 through 5e of the drawings. Alternatively, the frame 20 may be enclosed along the sides, top and rear utilizing panels attached to the frame 20.

Figure 7:
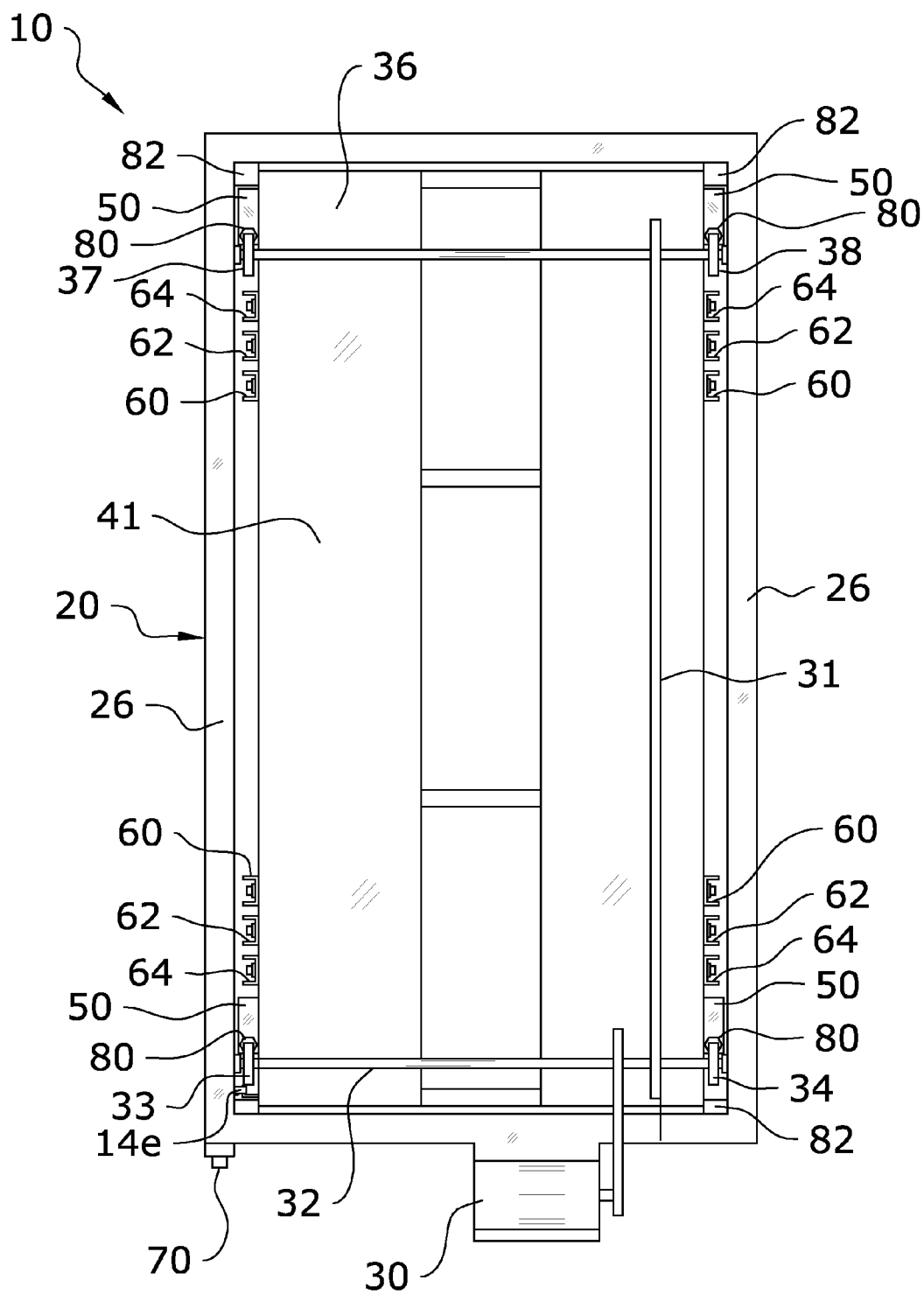
FIG. 7 is a top view of the present invention.
Figure 8:
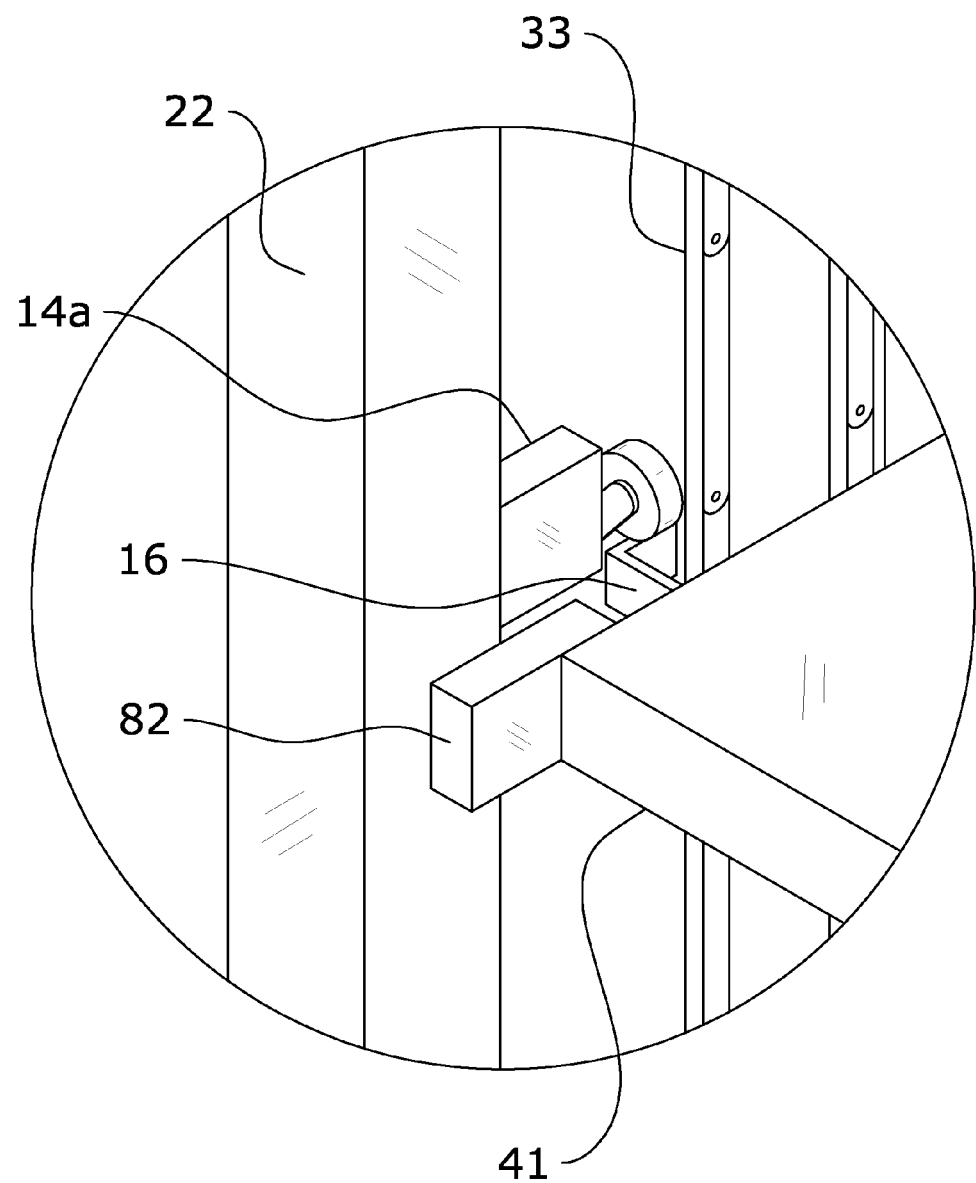
FIG. 8 is a magnified upper perspective view of the engaging member attached to the first platform engaging a first sensor.
Figure 9:
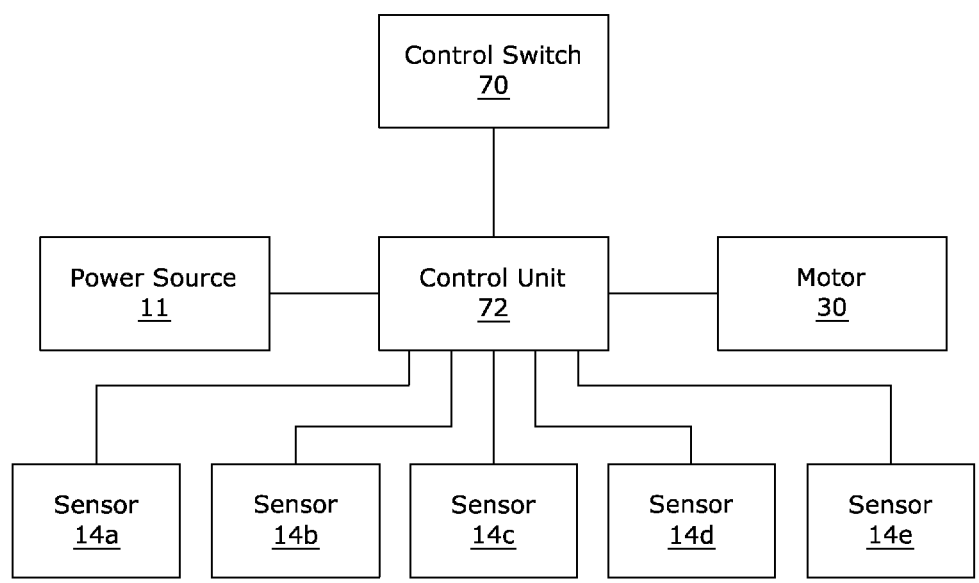
FIG. 9 is a block diagram illustrating the communications between the various devices of the present invention.

The frame 20 preferably has an elongated rectangular structure when viewed from the top as illustrated in FIG. 7 of the drawings. The frame 20 is comprised of a plurality of vertical members 22 that have a lower end positioned upon the floor and an upper end. The vertical members 22 are preferably parallel with respect to one another and further preferably form the corners of the frame 20.

The frame 20 includes a plurality of lower members 24 attached along a lower portion of the frame 20 along the sides and the rear of the frame 20 to provide support to the frame 20. The frame 20 also includes a plurality of upper members 26 attached along an upper portion of the frame 20 along the sides and the rear of the frame 20 similar to the lower members 24. The lower members 24 and the upper members 26 are preferably attached to the vertical members 22 as illustrated in FIGS. 1 through 5e. Additional support members may be attached to the frame 20 such as attached between the upper members 26 and lower members 24, between central portions of the vertical members 22 to provide additional support to the frame 20 and the like. It is preferable that at least the lower portion of the front opening of the frame 20 remain unobstructed by not having any support members extending within the lower portion of the front opening where the loading and unloading occurs.

C. Platforms.

Figures through 3e best illustrate the plurality of platforms 40 that are slidably positioned within the vertical storage space of the frame 20. The plurality of platforms 40 may be comprised of 2 or more platforms 40. The platforms 40 are preferably parallel with respect to each other at all positions within the frame 20. The platforms 40 are vertically movable within the vertical storage space within the frame 20 so the platforms 40 may be elevated and lowered within the frame 20. The platforms 40 are preferably not horizontally movable.

The platforms 40 are each comprised of a rectangular shape and each have a longitudinal axis extending along a horizontal plane that extends from a front end to a rear end for each of the platforms 40. Each of the platforms 40 preferably has a flat and thin structure to allow for compact stacking in the fully lowered position as illustrated in FIGS. 1, 2 and 4 of the drawings.

Figure 2:
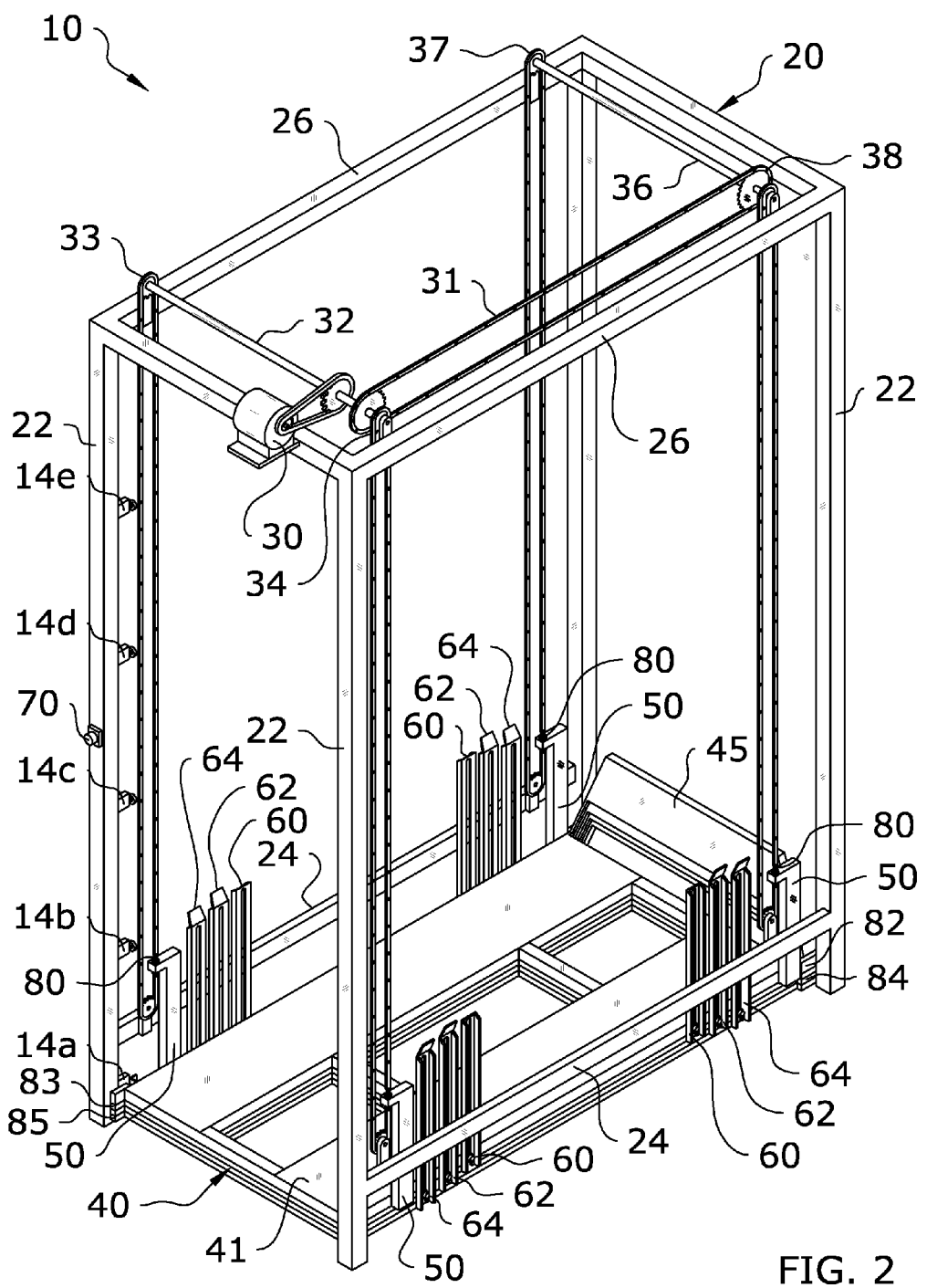
FIG. 2 is a front upper perspective view of the present invention with the covers removed from the chains.
Figure 3A:
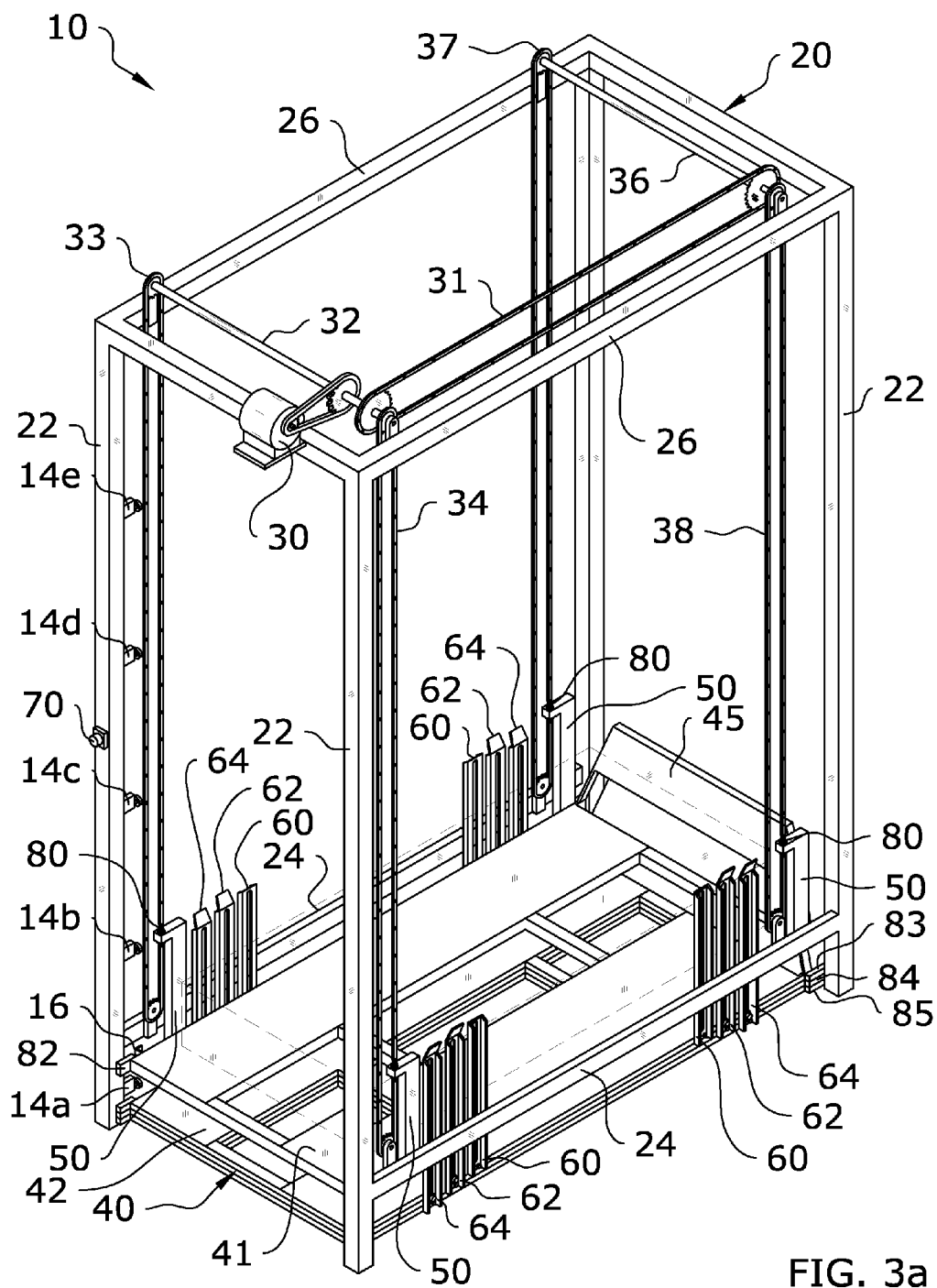
FIG. 3a is a front upper perspective view of the present invention with a first storage item positioned upon the first platform and wherein the first platform is partially raised.
Figure 3B:
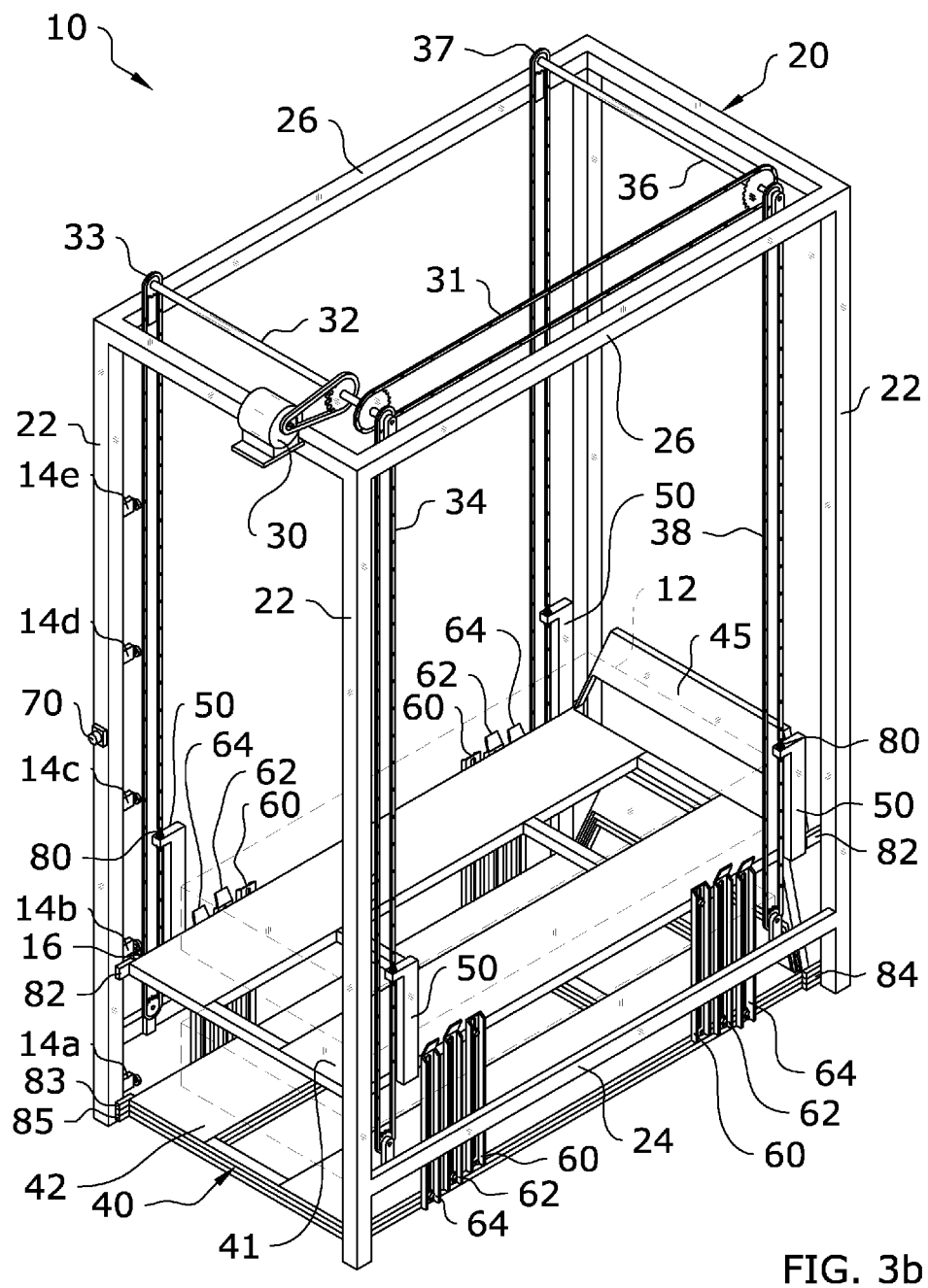
FIG. 3b is a front upper perspective view of the present invention with a first storage item positioned upon the first platform and with a second storage item positioned upon the second platform, wherein the second platform is at an initial lowered position.
Figure 3C:
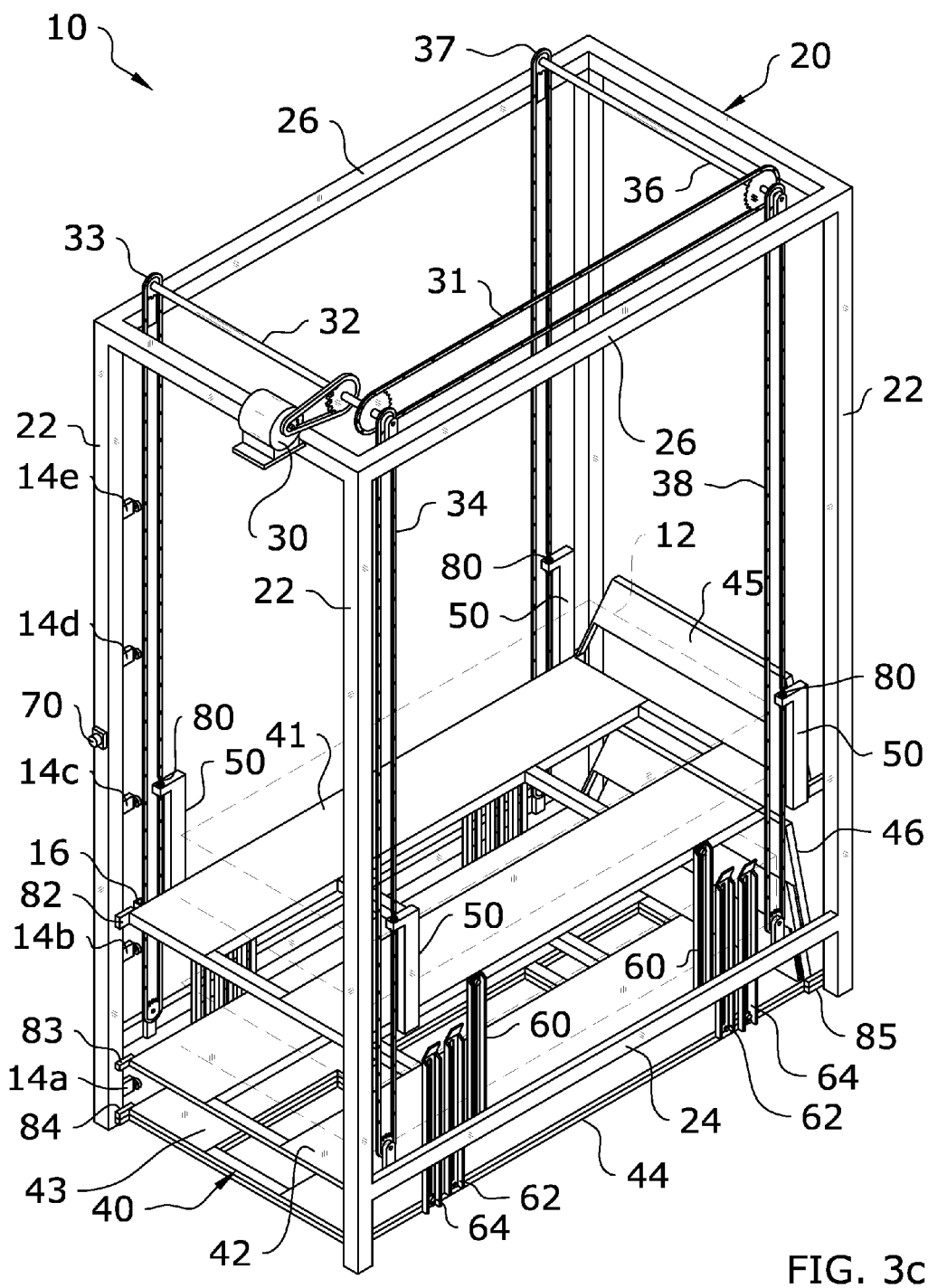
FIG. 3c is a front upper perspective view of the present invention with storage items on the first platform and the second platform, wherein the second platform is partially elevated.
Figure 3E:
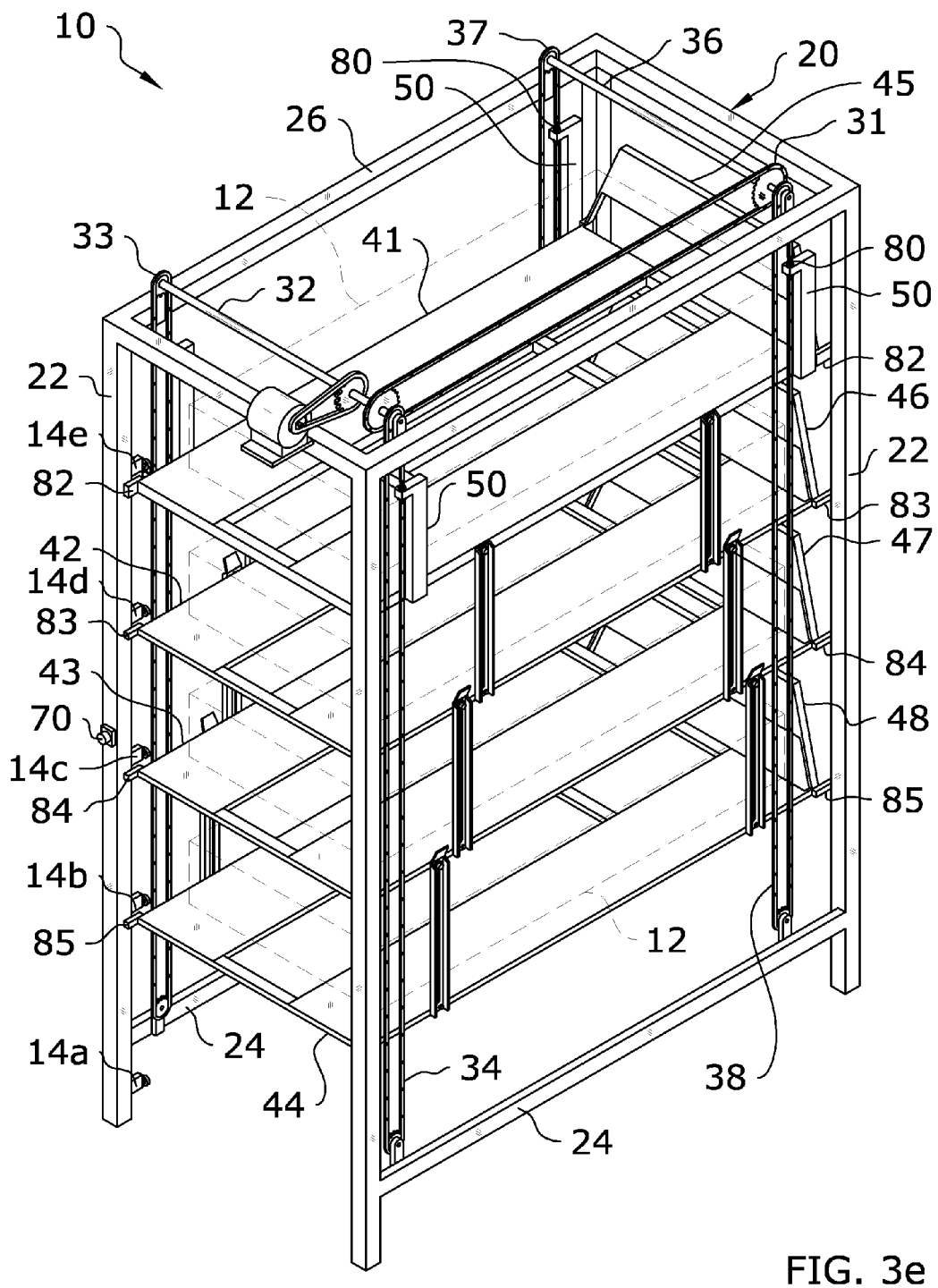
FIG. 3e is a front upper perspective view of the present invention with storage items on the first platform, the second platform, the third platform and the fourth platform, wherein the first platform along with the lower platforms are in the fully raised position for storage.
Figure 4:
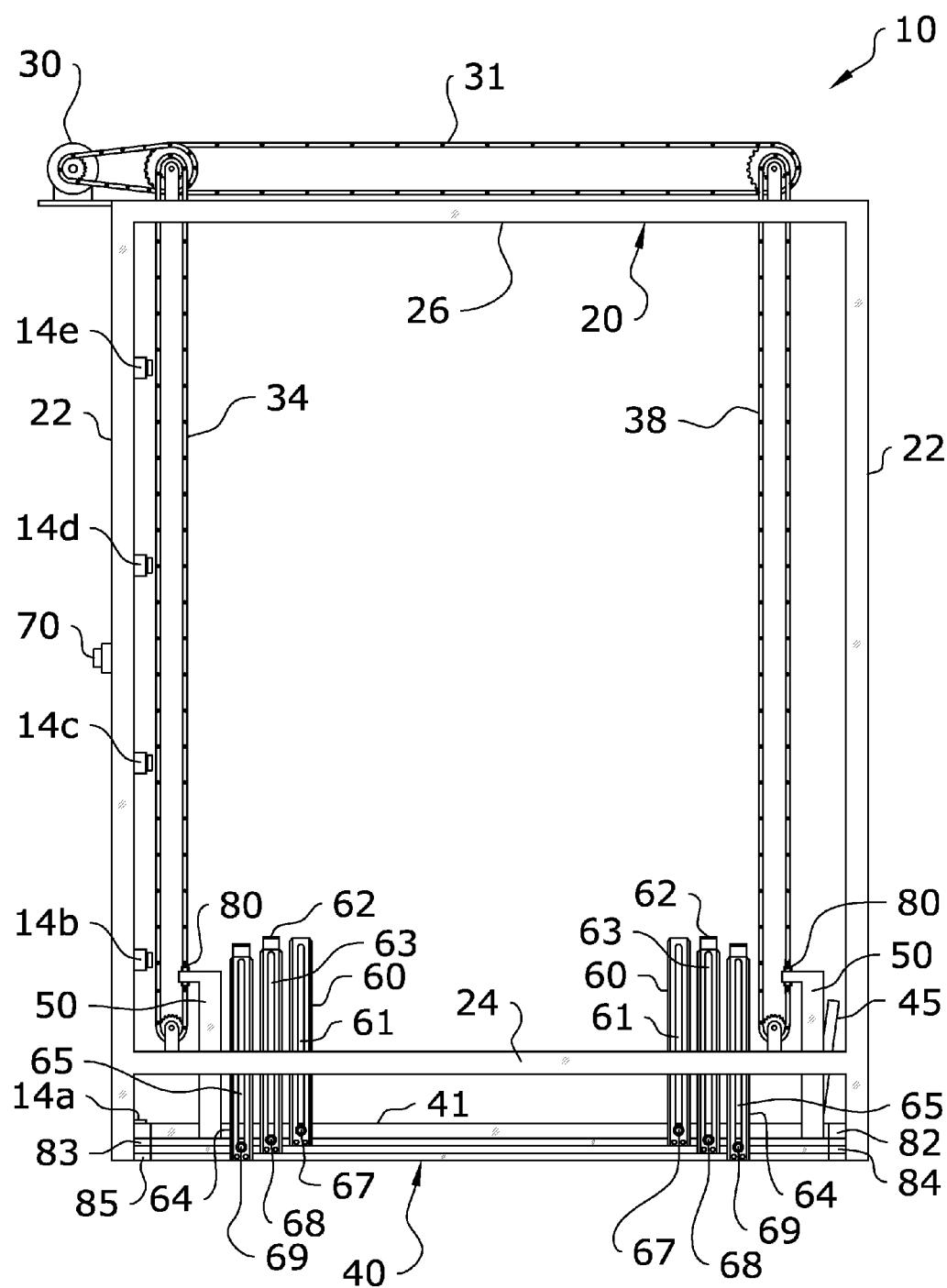
FIG. 4 is a side view of the present invention with all of the platforms in the initial lowered position.
Figure 5A:
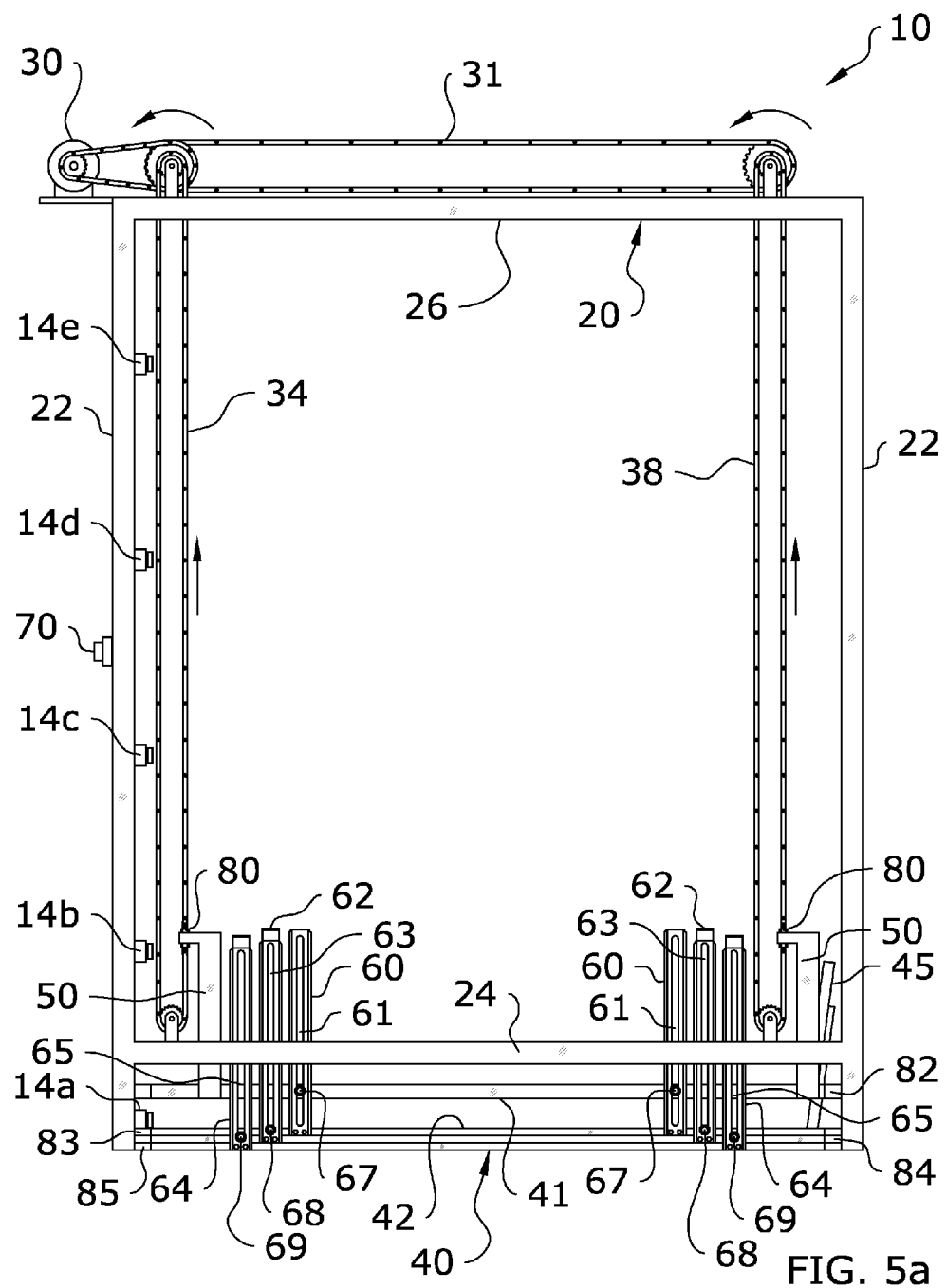
FIG. 5a is a side view of the present invention with the first platform partially raised.
Figure 5B:
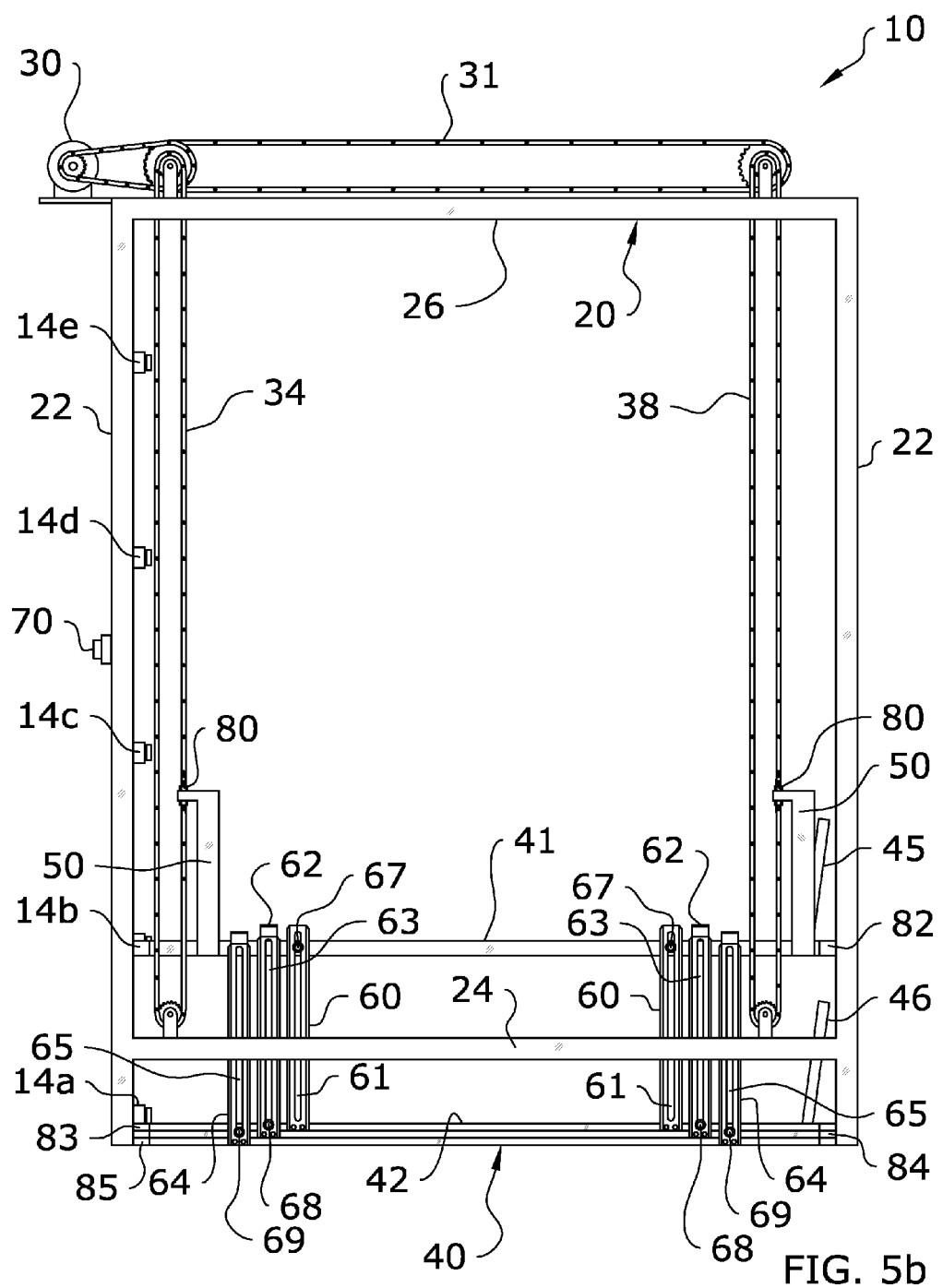
FIG. 5b is a side view of the present invention with the first platform partially raised exposing the second platform in the lowered position.
Figure 5C:
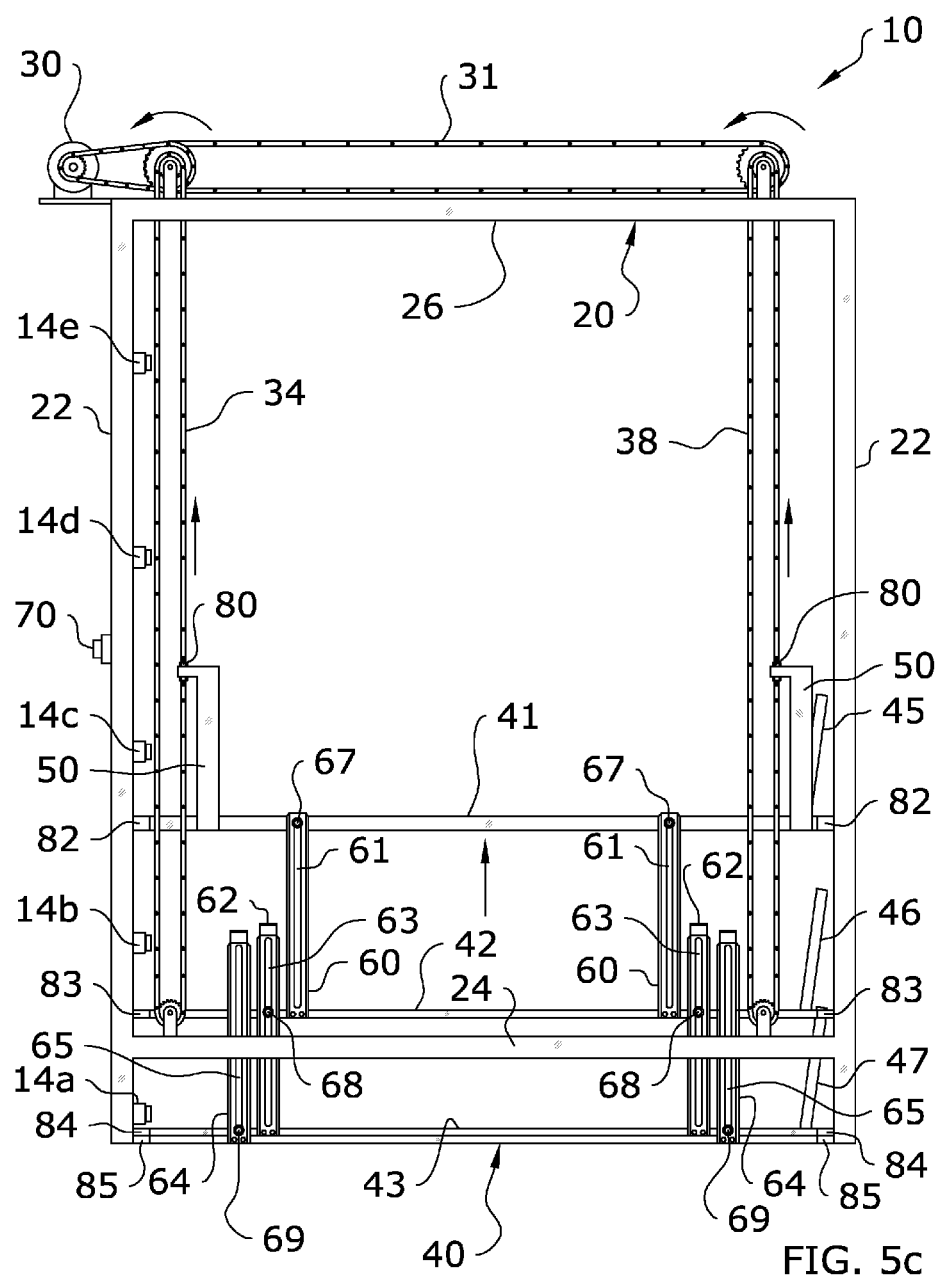
FIG. 5c is a side view of the present invention with the first platform and second platform partially raised.
Figure 5D:
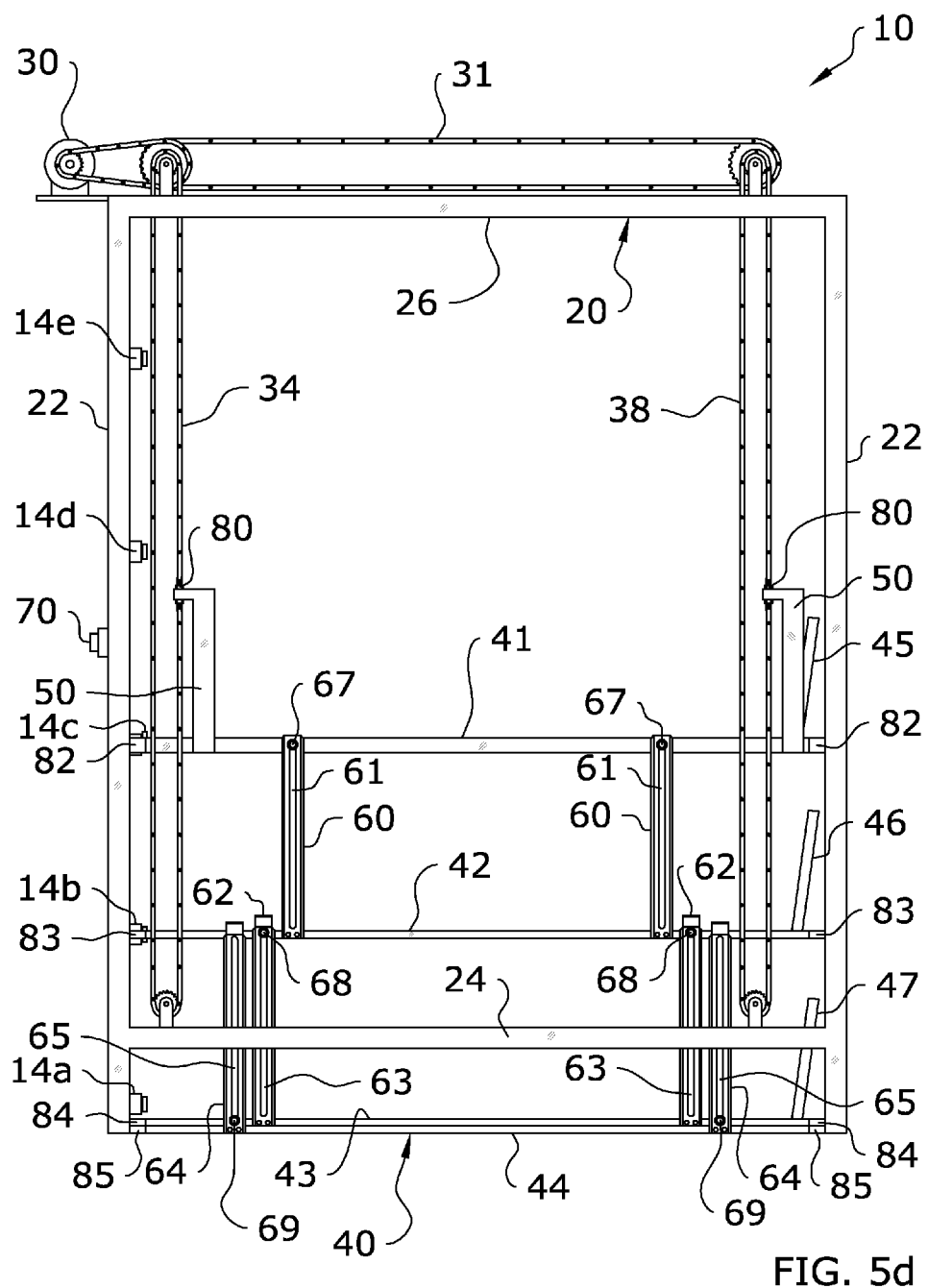
FIG. 5d is a side view of the present invention with the first platform and second platform partially raised exposing the third platform in the lowered position.
Figure 5E:
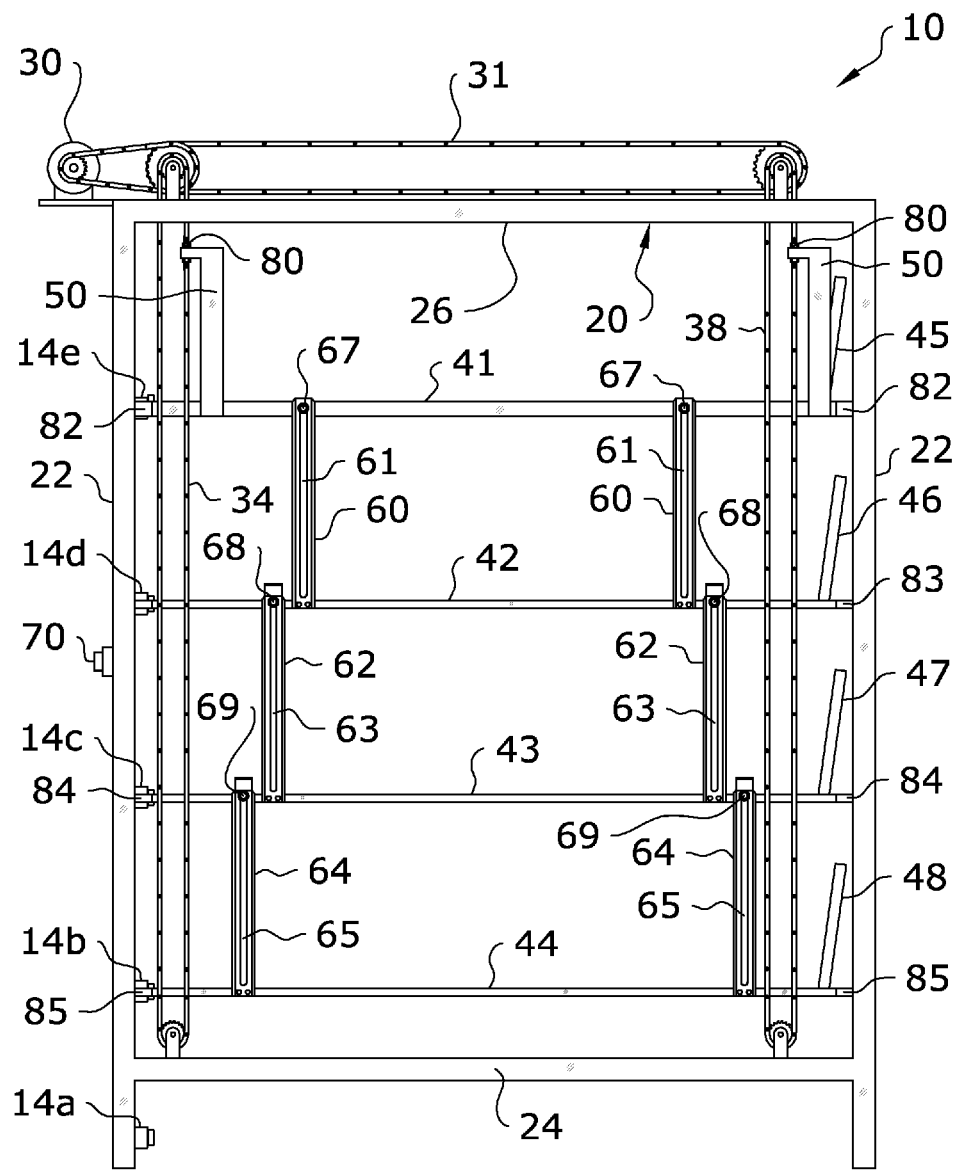
FIG. 5e is a side view of the present invention wherein the first platform along with the lower platforms are in the fully raised position for storage.

The platforms 40 are stacked upon one another when in an initial lowered position as illustrated in FIGS. 1, 2 and 4 of the drawings. The platforms 40 are separated from one another when in the fully raised position as illustrated in FIGS. 3e and 5e of the drawings. The distance between each of the platforms 40 when in the fully raised position is greater than the thickness of the storage item 12 to be stored. For example, a conventional mattress may have a thickness of between 5 inches to 20 inches or more. The distance between the platforms 40 is at least 5 inches or more.

Each of the platforms 40 preferably has a planar upper surface to receive the storage item 12 in a sliding or rolling manner. The storage item 12 may be slid upon the upper surface of the platforms 40 via the front opening within the frame 20. The platforms 40 may each have a central opening extending along a longitudinal axis of the platforms 40 to provide ventilation to the storage item 12 positioned upon the platforms 40 as illustrated in FIG. 3c of the drawings. If the central opening extends along the entire length of the platforms 40, end members extending between the side portions of each platform.

Figure 3D:
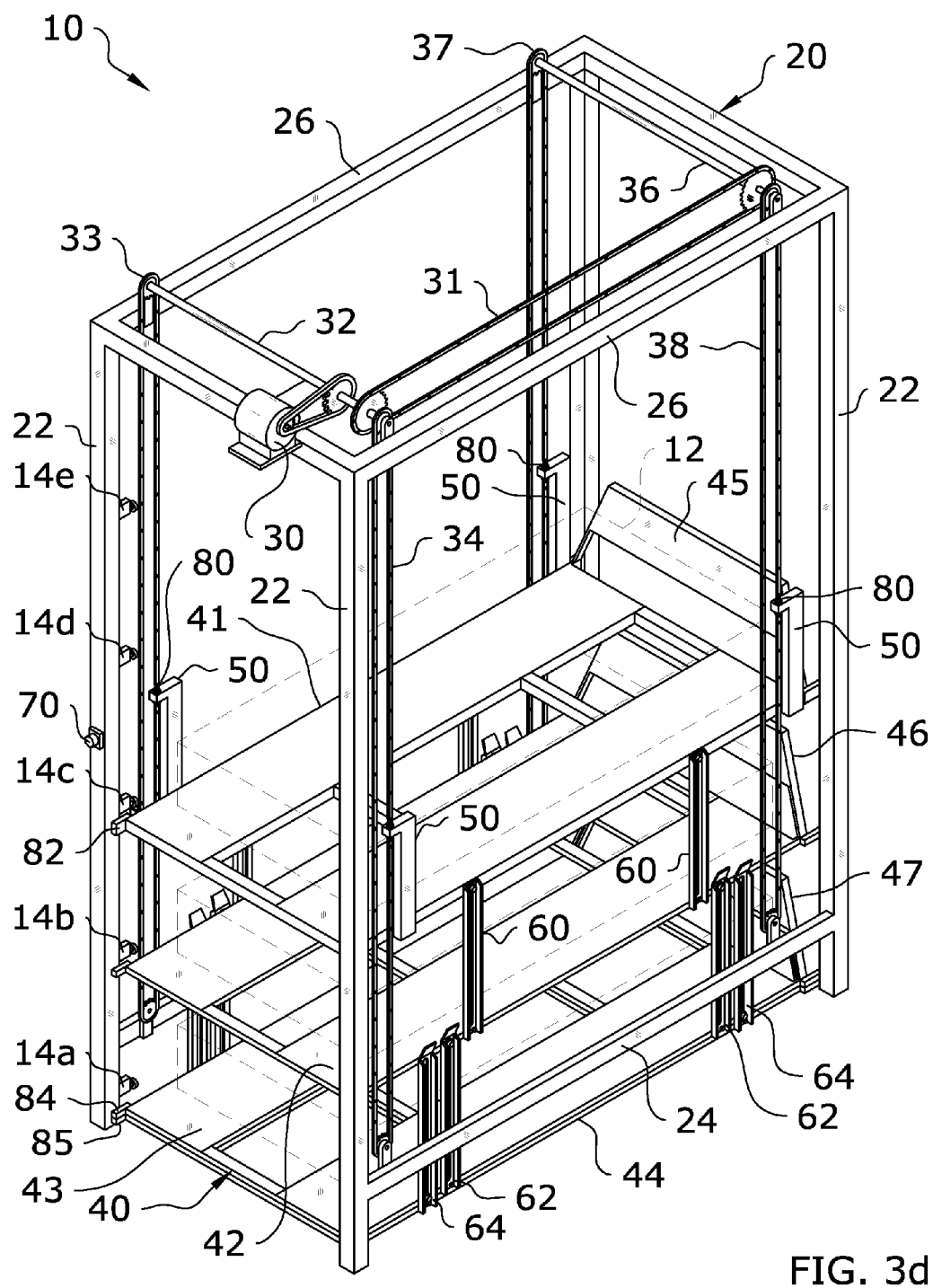
FIG. 3d is a front upper perspective view of the present invention with storage items on the first platform, the second platform and the third platform, wherein the third platform is fully exposed in the initial lowered position.

The platforms 40 are comprised of at least a first platform 41 and a second platform 42, wherein the second platform 42 is positioned below the first platform 41 as illustrated in FIGS. 3c and 3d of the drawings. The first platform 41 vertically supports the second platform 42 when the first platform 41 is in a fully raised position by a plurality of first connecting members 60 extending between the first platform 41 and the second platform 42. The first platform 41 does not vertically support the second platform 42 when the first platform 41 is in a fully lowered position shown in FIGS. 1, 2 and 4.

The platforms 40 are further preferably comprised of a third platform 43 and a fourth platform 44, wherein the third platform 43 is positioned below the second platform 42 and the fourth platform 44 is positioned below the third platform 43 as illustrated in FIGS. 3e and 5e of the drawings. The second platform 42 vertically supports the third platform 43 when the first platform 41 is in a fully raised position by a plurality of second connecting members 62 extending between the second platform 42 and the third platform 43. The third platform 43 vertically supports the fourth platform 44 when the first platform 41 is in a fully raised position by a plurality of third connecting members 64 extending between the third platform 43 and the fourth platform 44. It can be appreciated that a fifth platform, a sixth platform and more may be included within the platforms 40 though not illustrated in the drawings. The limit on the number of platforms 40 used is the required spacing between each of the platforms 40 and the total height of the frame 20. Other factors may determine the number of platforms 40 such as the total weight capacity and the like.

Each of the platforms 40 has a stop member 45, 46, 47, 48 attached to and extending upwardly from a rear portion of the platform to prevent the storage item 12 from being inserted rearwardly too far and to ensure proper positioning of the storage item 12 upon the platforms 40. The stop members at a rear end of each of the platforms thus prevent the bed frame thereon from being discharged through the rear end. The stop member 45, 46, 47, 48 for each of the plurality of platforms 40 extends upwardly and outwardly away from the plurality of platforms 40. Each stop member 45, 46, 47, 48 is preferably a flat planar structure as illustrated in FIGS. 3c and 3d of the drawings.

The platforms 40 further preferably include a plurality of guides 82, 83, 84, 85 at the corners that provide for slidable guidance along the length of the vertical members 22 of the frame 20 as illustrated in FIGS. 1 through 3e of the drawings. The guides 82, 83, 84, 85 are preferably constructed of a plastic material that reduces the friction between the frame 20 and the platforms 40. Each of the guides 82, 83, 84, 85 includes an L-shaped cutout that receives a corner portion of a corresponding vertical member 22. When the platforms 40 are in the compact storage position, the guides 82, 83, 84, 85 may touch one another to support the platforms 40 slightly apart or the platforms 40 may rest directly upon one another. The first platform 41 includes four first guides 82 at the corners thereof, the second platform 42 includes four second guides 83 at the corners thereof, the third platform 43 includes four third guides 84 and the fourth platform 44 includes four fourth guides 85 at the corners thereof.

D. Connecting Members.

The plurality of connecting members 60, 62, 64 are slidably connected between adjacent platforms 40 so that when the platforms 40 are in the fully raised position, each platform is vertically supported by the platform above it as illustrated in FIGS. 3e and 5e of the drawings. The connecting members 60, 62, 64 allow for the platforms 40 to be stacked upon one another when in the fully lowered position without requiring additional space or interfering with the stacking of the platforms 40 as illustrated in FIGS. 1, 2 and 4. The connecting members are arranged as shown in FIG. 1 to prevent the bed frame thereon from being discharged through sides of each of the platforms.

To accomplish the compact stacking of the platforms 40 without interference by the connecting members 60, 62, 64, the connecting members 60, 62, 64 are attached to the opposing sides of the platforms 40. For example, the first connecting members 60 are connected to the two opposing longitudinal sides of the first platform 41 and extend downwardly to connect to the second platform 42 that is beneath the first platform 41. When the first platform 41 is lowered upon the second platform 42, the first connecting members 60 pass along the sides of the first platform 41 and/or second platform 42 without interfering with the lowering of the first platform 41.

Each of the connecting members 60, 62, 64 is preferably attached in a non-movable or pivotal relationship to one of the plurality of platforms 40 and in a slidable relationship to another of the platforms 40. There are two embodiments disclosed in the application for the slidable connection for the connecting members 60, 62, 64. The connecting members 60, 62, 64 preferably have a U-shaped cross sectional shape.

Figure 5F:
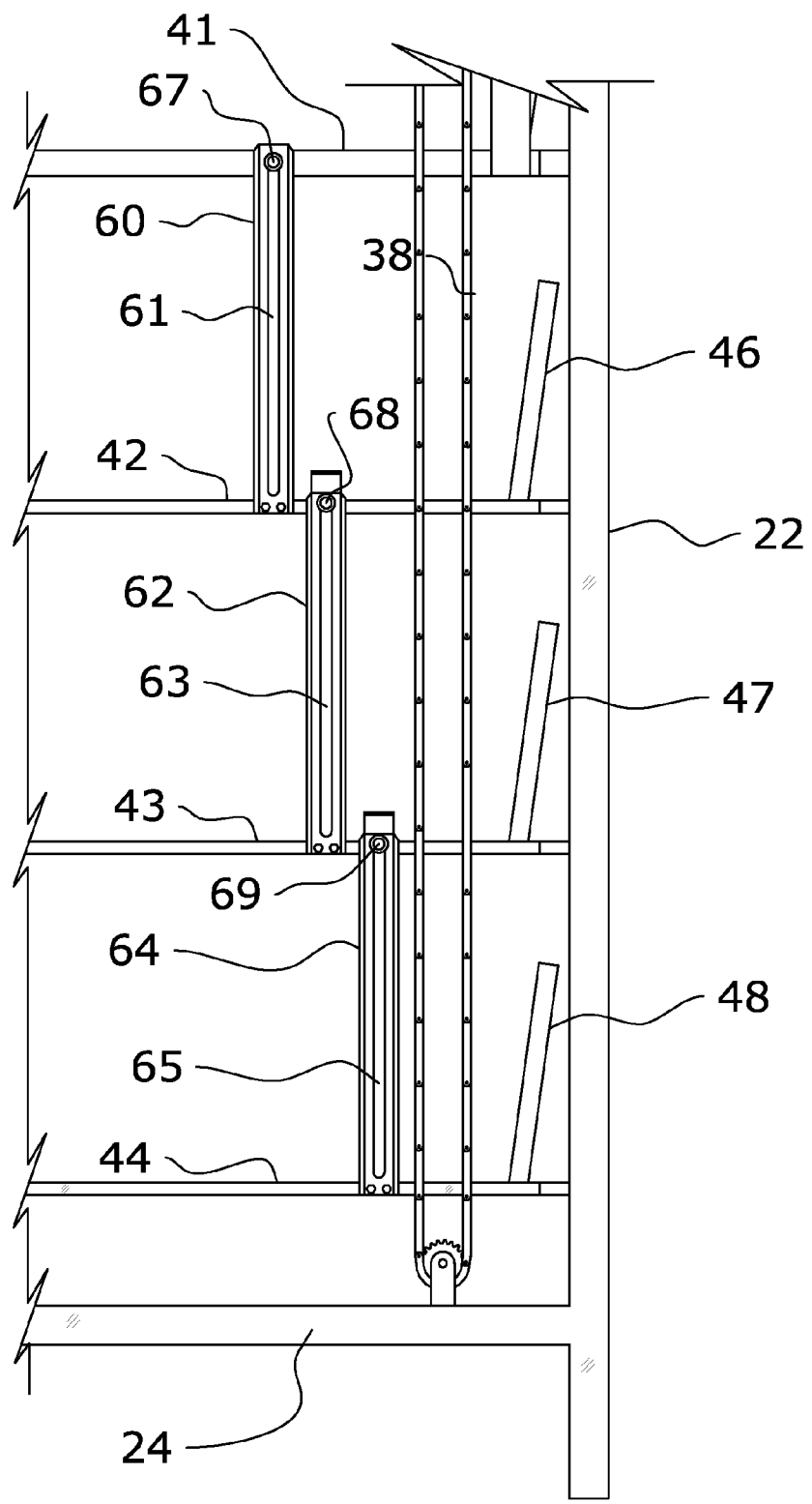
FIG. 5f is a magnified side view illustrating a third connecting member with a third engaging member slidably received within the third slot of the third engaging member.
Figure 6:
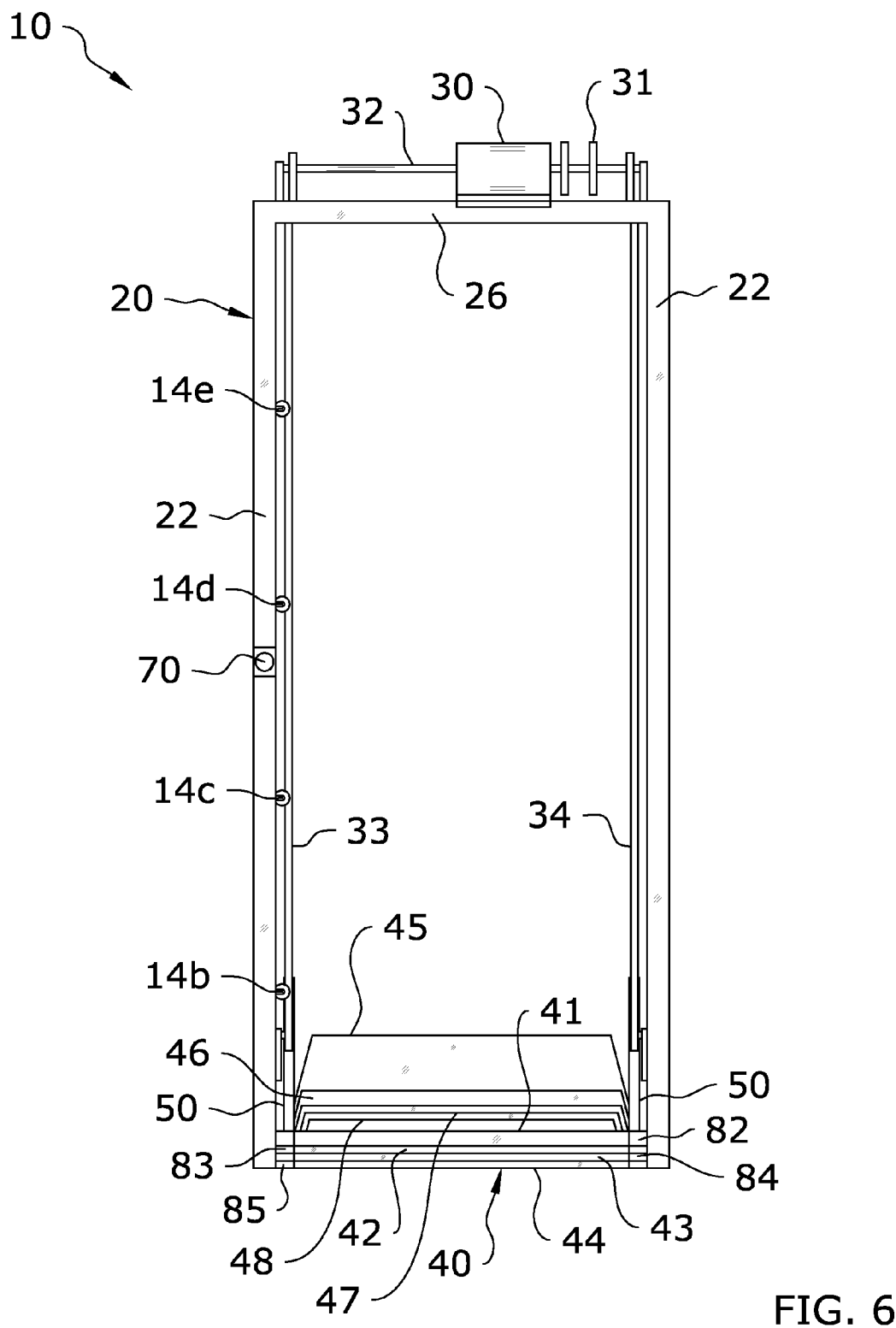
FIG. 6 is a front view of the present invention in the fully lowered position illustrating the front opening within the frame for loading the storage items.

FIGS. 1 through 5f illustrate a first embodiment of slidable connection comprised of the connecting members 60, 62, 64 each having respective slots 61, 63, 65 that slidably receive corresponding engaging members 67, 68, 69 extending from one of the platforms 40. The engaging members 67, 68, 69 are comprised of a narrow portion extending from the corresponding platforms 40 that slidably extends through the slots 61, 63, 65 with a flanged distal end that is broader than the slots 61, 63, 65. It is preferable to have four engaging members 67, 68, 69 between each of the platforms 40 with one engaging member 67, 68, 69 in approximately each of the four corners of the platforms 40. In particular, the first connecting members 60 each are connected to the second platform 42 and extend upwardly in a vertical manner therefrom. The first connecting members 60 are preferably non-movably attached to the second platform 42. The first slots 61 within the first connecting members 60 extend along the longitudinal axis of the first connecting members 60 and are vertically orientated. The first engaging members 67 extend outwardly from both sides of the first platform 41 and are slidably received within the first slots 61 within the first connecting members 60. When the first platform 41 moves upwardly away from the second platform 42, the first engaging member 67 freely moves along the first slot without lifting the second platform 42 until the first engaging member 67 engages the upper end of the first slot and then the second platform 42 is lifted correspondingly with the first platform 41. The second connecting members 62 between the second platform 42 and the third platform 43 are connected and operate the same way as the first connecting members 60. The third connecting members 64 between the third platform 43 and the fourth platform 44 are connected and operate the same way as the first connecting members 60 also. It should be noted that the connecting members 60, 62, 64 are offset from one another to avoid interference with each other as illustrated in FIGS. 1 through 5f of the drawings. For example, the first connecting members 60 are positioned inwardly with respect to the second connecting members 62 and the second connecting members 62 are positioned inwardly with respect to the third connecting members 64 as illustrated in FIGS. 3e, 5e and 5f of the drawings.

Figure 10A:
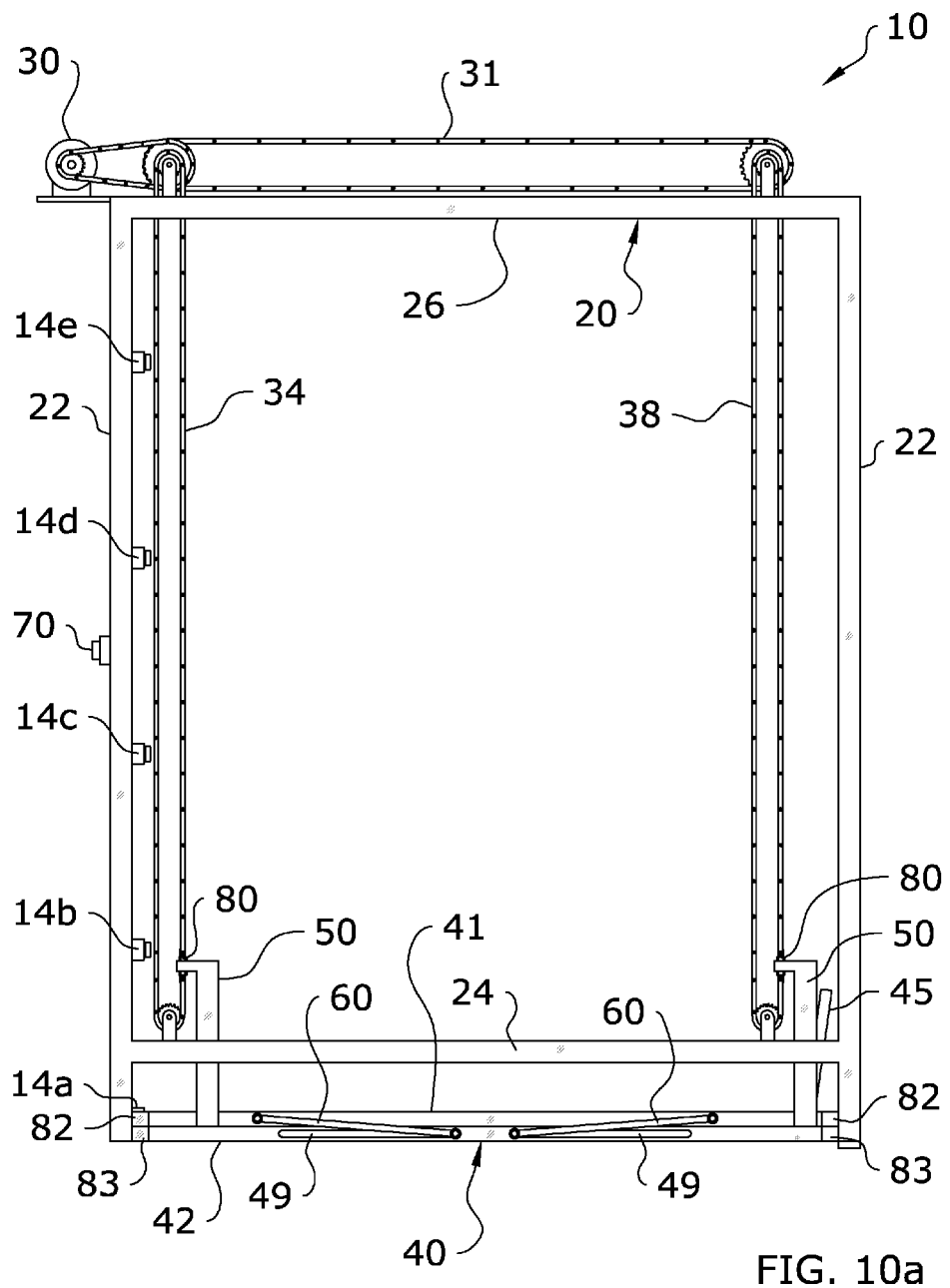
FIG. 10a is a side view of an alternative embodiment.
Figure 10B:
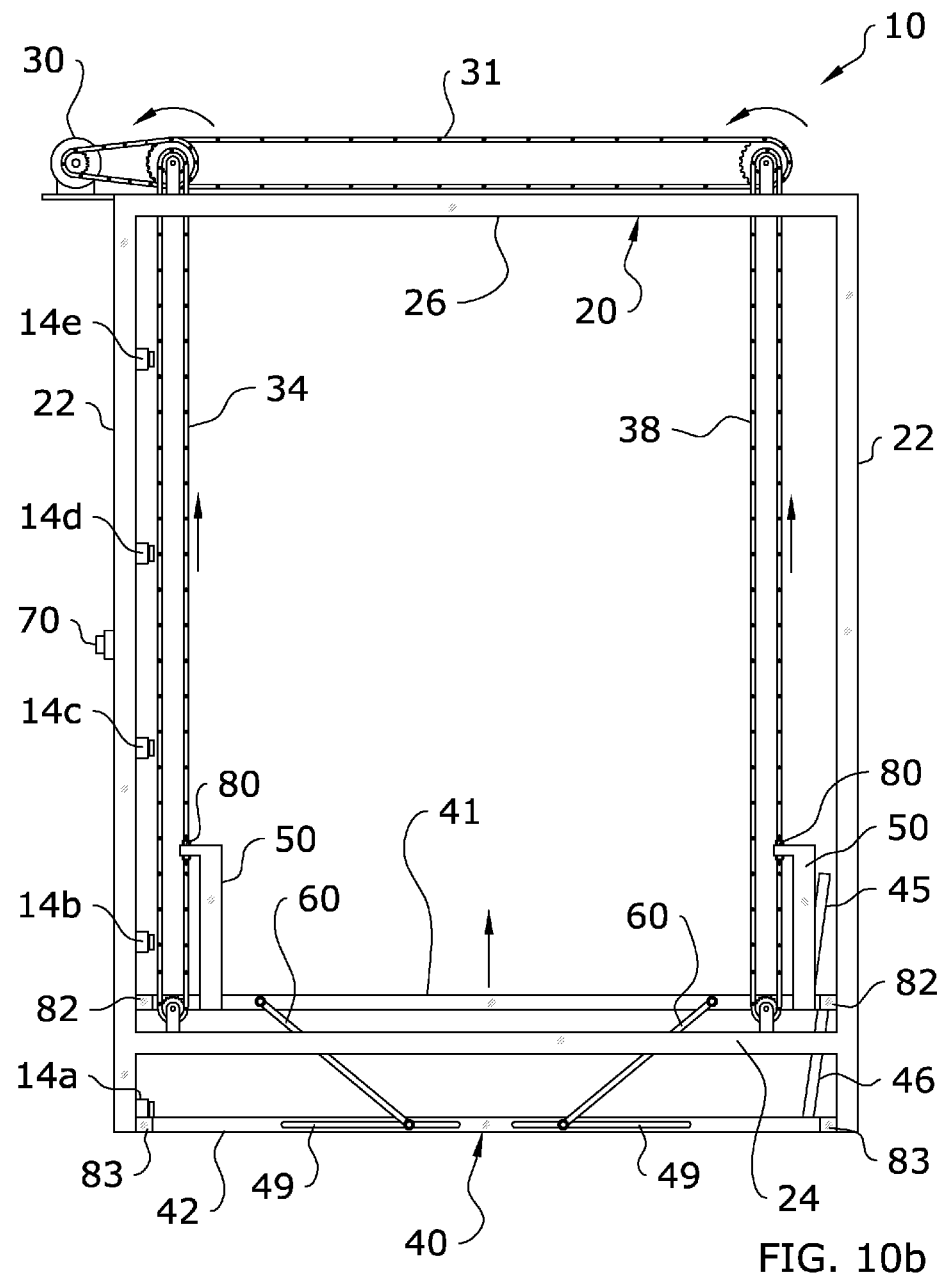
FIG. 10b is a side view of the alternative embodiment with the first platform partially raised.
Figure 10C:
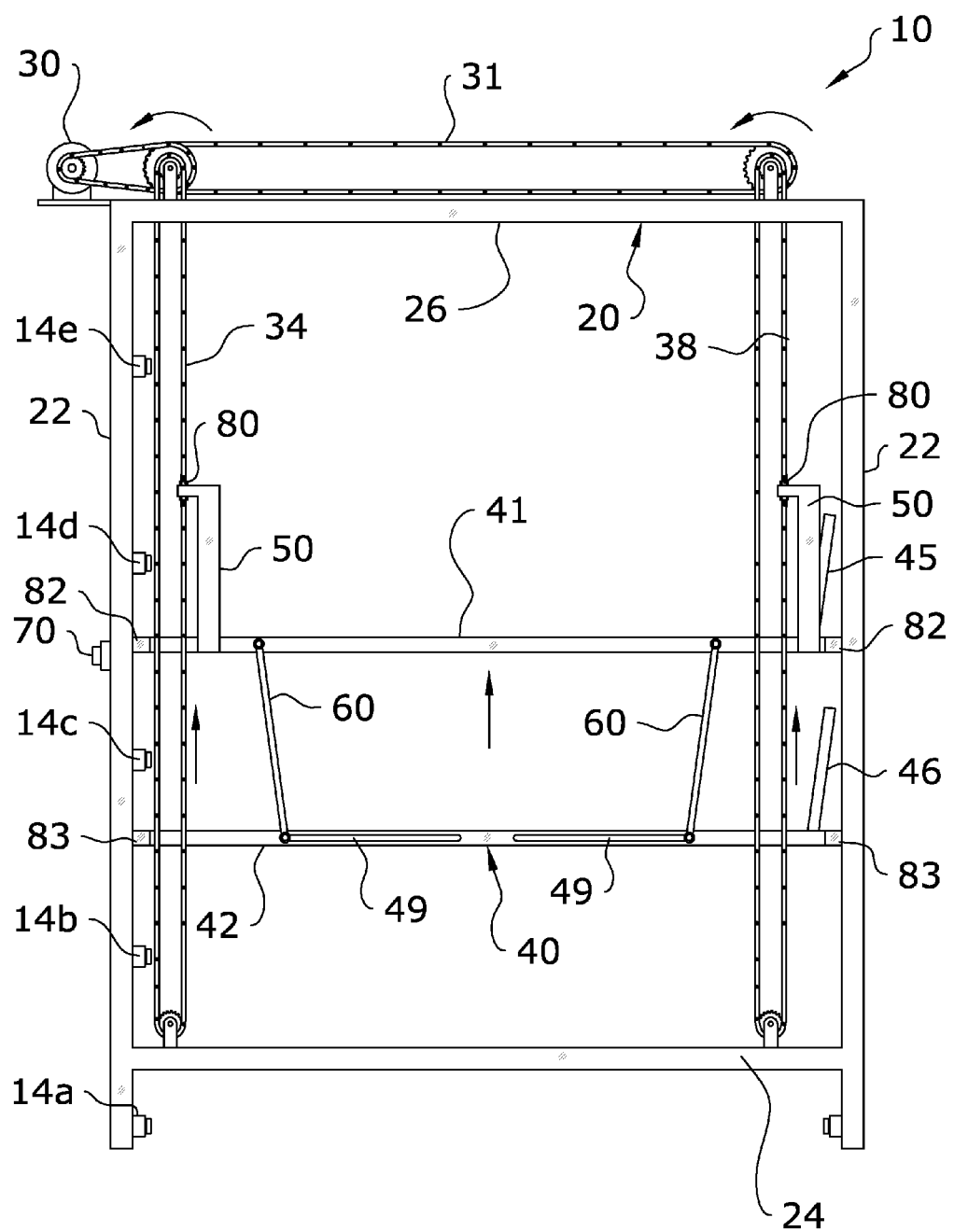
FIG. 10c is a side view of the alternative embodiment with the first platform raised and supporting the next lower platform.

FIGS. 10a through 10c illustrate the second embodiment of the slidable connection comprised of the connecting members 60, 62, 64 pivotally attached to the upper platform and slidably connected to the lower platform. In particularly, each of the platforms 40 includes a plurality of side slots 49 within both sides of the platforms 40 that slidably receive an engaging member 67, 68, 69. The side slots 49 extend horizontally along with the plane of the platforms 40. There are preferably two side slots 49 on a first side and two side slots 49 on a second side of each of the platforms 40. As the first platform 41 is elevated, the first connecting members 60 slide with respect to the second platform 42 and pivot upon the first platform 41 as best illustrated in FIGS. 10b and 10c of the drawings. Once the first connecting members 60 engage an end of the side slots 49 within the second platform 42, the second platform 42 is then lifted along with the first platform 41 as illustrated in FIG. 10c of the drawings. The second connecting members 62 and the third connecting members 64 are connected to their respective platforms 40 the same way and lift the same accordingly.

E. Lifting and Lower System.

A winch device for lifting and lowering the platforms 40 in a controlled manner is connected to the first platform 41. The first platform 41 is the uppermost platform of the plurality of platforms 40 as discussed previously. The winch device is adapted to lift and lower the first platform 41 which in turn lifts/lowers the second platform 42 which in turn lifts/lowers the third platform 43 which in turn lifts/lowers the fourth platform 44 and so forth for additional platforms 40.

The winch device is preferably comprised of a motor 30 that is electrically powered by an electrical power source 11. The winch device may be a manual device with gearing that is hand operated by a user to lift and lower the platforms 40.

The motor 30 is connected to a first drive shaft 32 and a second drive shaft 36 by a connecting member (e.g. chain or other drive system), wherein the first drive shaft 32 and the second drive shaft 36 are rotatably attached to an upper portion of the frame 20 as best illustrated in FIGS. 1 through 3*e* of the drawings. The first drive shaft 32 is mechanically connected to the second drive shaft 36 by a connecting elongated member 31 so that the first drive shaft 32 and the second drive shaft 36 rotate in the same direction. The connecting elongated member 31 may be comprised of a chain or a drive shaft with gearing connected to the first drive shaft 32 and the second drive shaft 36.

The first drive shaft 32 is connected to a front portion of the first platform 41 and the second drive shaft 36 is connected to a rear portion of the first platform 41 for lifting and lowering the first platform 41. In particular, a first elongated member 33 is connected between the first drive shaft 32 and the first platform 41, a second elongated member 34 is connected between the first drive shaft 32 and the first platform 41 on a side of the first platform 41 opposite of the first elongated member 33, a third elongated member 37 is connected between the second drive shaft 36 and the first platform 41, and a fourth elongated member 38 is connected between the second drive shaft 36 and the first platform 41 on a side of the first platform 41 opposite of the third elongated member 37. The elongated members are preferably flexible and have a length at least equal to or greater than the distance the first platform 41 is elevated from the fully lowered position in FIG. 1 to the fully raised position in FIG. 3*e*. The elongated members are each preferably comprised of a length of chain, a length of strap or a length of cable. The elongated members each have a first end and a second end with at least one end connected to the first platform 41. It is preferable that both the first end and the second end of the elongated members are connected to the first platform 41. In particular, pulleys attached to the drive shafts receive and move the elongated members in a vertical manner along a first run of the elongated members with the second run of the elongated members moving in an opposite directly. The first run and the second run for the elongated members are preferably parallel to one another as best illustrated in FIGS. 5*a* through 5*e* of the drawings. When the first run moves upwardly, the second run moves downwardly. A corresponding number of pulleys are rotatably attached to a lower portion of the frame 20 and receive the elongated members as illustrated in FIGS. 5*a* through 5*e* of the drawings. The pulley may have sprockets particularly when used with elongated chains.

The elongated members are preferably each at least partially protected by a corresponding number of elongated covers 29 as illustrated in FIG. 1 of the drawings. The covers 29 surround a significant portion of the elongated members. The covers 29 each include a slot extending longitudinally along the side of the covers 29, wherein the connectors 50 extend into the interior portion of the covers 29 through the slots and are attached to the elongated members as illustrated in FIG. 1 of the drawings.

To allow for leveling of the platforms 40 during lifting, there are preferably at least four adjustable members 80 connected to the first platform 41. The elongated members are each connected to one of the at least four adjustable members 80 and the at least four adjustable members 80 are adapted to adjust a vertical connection point for the plurality of elongated members. The adjustable members 80 are preferably comprised of threaded shafts that are threadably received within the first platform 41 or connectors 50 extending upwardly from the corner portions of the first platform 41. The user simply rotates the adjustable members 80 to increase or decrease the height of the corresponding portion of the first platform 41 as desired. The connectors 50 preferably extend upwardly a distance approximately equal to the distance of the spacing between the platforms 40.

F. Control System.

A control unit 72 is in communication with a control switch 70 for allowing a user to control the operation of the motor 30. The control switch 70 receives input from the user as to whether the platforms 40 should be raised or lowered. The control switch 70 may be comprised of various switch structures utilized to control the operation of an electric motor 30. The control unit 72 may be comprised of any electronic control device capable of controlling the electric motor 30.

At least one sensor is connected to the frame 20 to detect a position of the first platform 41 during lifting and lowering. The sensor is in communication with a control unit 72 and the control unit 72 automatically stops the winch device when the first platform 41 is detected by the at least one sensor at a fully raised position. It is preferable to utilize a plurality of sensors 14*a-e* connected to one of the vertical members 22 of the frame 20 to detect a position of the first platform 41. The plurality of sensors 14*a-e* are distally spaced apart the same distance and aligned so as to detect the first platform 41 just before or at the time that the next platform is going to be lifted. The first sensor 14*a* detects the position of the first platform 41 when in the fully lowered position. The second sensor 14*b* detects the vertical position of the first platform 41 just before or at the location the second platform 42 is lifted by the first platform 41. The third sensor 14*c* detects the vertical position of the first platform 41 just before or at the location the third platform 43 is lifted by the second platform 42. The fourth sensor detects the vertical position of the first platform 41 just before or at the location the fourth platform 44 is lifted by the third platform 43. The fifth sensor detects the vertical position of the first platform 41 at the fully raised position. The sensors 14*a-e* are in communication with a control unit 72 and the control unit 72 automatically stops the winch device when the first platform 41 is detected by one of the plurality of sensors 14*a-e* to be in a first intermediate vertical position and when the first platform 41 is detected by one of the plurality of sensors 14*a-e* to be in a fully raised position. The sensors 14*a-e* may be comprised of various types of sensors such as but not limited to optical sensors that optically detect the position of the first platform 41, mechanical sensors that are mechanically engaged by an extended member 16 extending from the first platform 41, motion sensors that detect the motion of the platforms 40 and the like. The operator has to manually activate the control switch 70 after the control unit 72 automatically stops the motor 30 to continue movement of the platforms 40.

G. Operation of Preferred Embodiment.

Initially, the platforms 40 are in the stacked position in the fully lowered position as illustrated in FIGS. 1, 2 and 4 of the drawings so that the platforms are stacked directly upon one another in with a bottom one of said platforms being arranged at the floor. With the plurality of platforms in the initial lowered position a first one of the bed frames is moved in rolling manner from the floor through the front opening onto stationary surfaces of two parallel receiving plates 41A and 41B of the uppermost platform and subsequently each of the plurality of the bed frames is moved in rolling manner from the floor through the front opening onto the stationary surfaces of two parallel receiving plates of each of the subsequent platforms in turn. Finally as shown in FIGS. 3e and 5e the lowermost one of the platforms is raised from the floor to allow a final one of the bed frames to be stored on the floor underneath. The user positions a first storage item 12 upon the first platform 41 and then activates the control switch 70 to initiate the lifting of the first platform 41 by the motor 30. The first platform 41 proceeds upwardly until the second sensor 14b detects the first platform 41 whereby the control unit 72 deactivates the motor 30. The user positions a second storage item 12 upon the second platform 42 and then activates the control switch 70 to initiate the lifting of the first platform 41 by the motor 30. The first platform 41 proceeds upwardly until the third sensor 14c detects the first platform 41 whereby the control unit 72 deactivates the motor 30. The user positions a third storage item 12 upon the third platform 43 and then activates the control switch 70 to initiate the lifting of the first platform 41 by the motor 30. The first platform 41 proceeds upwardly until the fourth sensor 14d detects the first platform 41 whereby the control unit 72 deactivates the motor 30. The user positions a fourth storage item 12 upon the fourth platform 44 and then activates the control switch 70 to initiate the lifting of the first platform 41 by the motor 30. The first platform 41 proceeds upwardly until the fifth sensor 14e detects the first platform 41 whereby the control unit 72 deactivates the motor 30 with the platforms 40 in the fully raised position as shown in FIGS. 3e and 5e.

To unload the storage item 12 from the platforms 40, the user first activates the control switch 70 to lower the platforms 40 until the fourth sensor 14d detects the first platform 41 wherein the control unit 72 then deactivates the motor 30 with the fourth platform 44 at the fully lowered position for unloading the fourth storage item 12. The user removes the fourth storage item 12 from the fourth platform 44 and then activates the control switch 70 which activates the motor 30 to lower the first platform 41 (in turn lowering all of the platforms 40). When the first platform 41 is detected by the third sensor 14c, the control unit 72 deactivates the motor 30 to stop the lowering of the platforms 40. The user then removes the third storage item 12 from the third platform 43 and then activates the control switch 70 which activates the motor 30 to lower the first platform 41 (in turn lowering the second platform 42 and the third platform 43). When the first platform 41 is detected by the second sensor 14b, the control unit 72 deactivates the motor 30 to stop the lowering of the platforms 40. The user then removes the second storage item 12 from the second platform 42 and then activates the control switch 70 which activates the motor 30 to lower the first platform 41 (in turn lowering the second platform 42). When the first platform 41 is detected by the first sensor 14a, the control unit 72 deactivates the motor 30 to stop the lowering of the first platform 41 which is now in the fully lowered position as shown in FIGS. 1, 2 and 4 of the drawings. The user then removes the first storage item 12 from the first platform 41.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A method for storing a plurality of bed frames comprising:
   providing a frame defining a front opening and a vertical storage space having a longitudinal axis that is vertically orientated;
   mounting said frame on a floor surface;
   providing a plurality of platforms slidably positioned within said vertical storage space of said frame;
   wherein said plurality of platforms are parallel to one another in a stack from an uppermost platform to a lowermost platform and are vertically movable;
   lowering said plurality of platforms so that the platforms are stacked directly upon one another in an initial lowered position with the lowermost one of said platforms being arranged at the floor;
   with said plurality of platforms in the initial lowered position moving a first one of the bed frames in rolling manner from the floor through the front opening onto stationary surfaces of two parallel receiving plates of the uppermost platform;
   using a winch device on the frame connected to a first platform of said plurality of platforms, wherein said first platform is the uppermost platform of said plurality of platforms, to lift and lower said first platform;
   providing a plurality of connecting members slidably connected between each platform of said plurality of platforms and a next adjacent underlying one of the platforms;
   lifting the uppermost platform using the winch in steps to separate the uppermost platform from each of the subsequent ones of the platforms in turn;
   moving each of a plurality of the bed frames in rolling manner from the floor through the front opening onto stationary surfaces of two parallel receiving plates of each of the subsequent ones of the platforms in turn;
   providing a stop member at a rear end of each of the platforms thereby preventing the bed frame thereon from being discharged through the rear end;
   preventing the bed frame thereon from being discharged through sides of each of the platforms;
   and subsequently unloading each of the bed frames in turn from each of the platforms by moving each of the bed frames in rolling manner to the floor through the front opening from the stationary surfaces of said two parallel receiving plates of each of the subsequent ones of the platforms in turn.

2. The method according to claim 1 wherein the lowermost one of the platforms is raised from the floor to allow a final one of the bed frames to be stored on the floor underneath.

3. The method according to claim 1 wherein the bed frame is prevented from being discharged through the sides of each of the platforms by the connecting members.

* * * * *